United States Patent
Smith et al.

[15] 3,694,423
[45] Sept. 26, 1972

[54] OLEFIN CATALYST SLURRY FEEDING PROCESS AND APPARATUS

[72] Inventors: Wayne E. Smith, Overland Park; Robert L. Batchelor, Shawnee Mission, both of Kans.; Kenneth J. Fulk, Tiffin, Ohio

[73] Assignee: Gulf Research & Development Company, Pittsburgh, Pa.

[22] Filed: Jan. 18, 1971

[21] Appl. No.: 107,226

[52] U.S. Cl. ............... 260/94.3, 23/288 E, 222/322, 222/501, 239/87, 239/88, 239/89, 251/324, 260/93.5 S, 260/93.7, 260/94.9 P
[51] Int. Cl. .............................. C08f 1/98, C08f 3/02
[58] Field of Search .... 239/5, 87, 88, 89; 260/94.9 P, 260/94.3, 93.5 S, 93.7; 23/288 E; 222/322, 149, 501; 251/324

[56] References Cited
UNITED STATES PATENTS

| | | | |
|---|---|---|---|
| 2,283,725 | 5/1942 | Eichelberg | 239/96 |
| 894,978 | 8/1908 | Peache | 239/88 |
| 3,248,179 | 4/1966 | Norwood | 260/94.9 P |

Primary Examiner—Joseph L. Schofer
Assistant Examiner—A. Holler
Attorney—Richard L. Kelly, Carl A. Cline, Forrest D. Stine and Howard F. Van Denburgh

[57] ABSTRACT

In mono 1-olefin and diolefin polymerization processes, an improved method and apparatus for introducing a catalyst slurry into the polymerization zone which comprises pressurizing a catalyst slurry through a first transport zone to a second transport zone and thereafter sweeping the catalyst slurry through the second transport zone to the polymerization zone.

5 Claims, 2 Drawing Figures

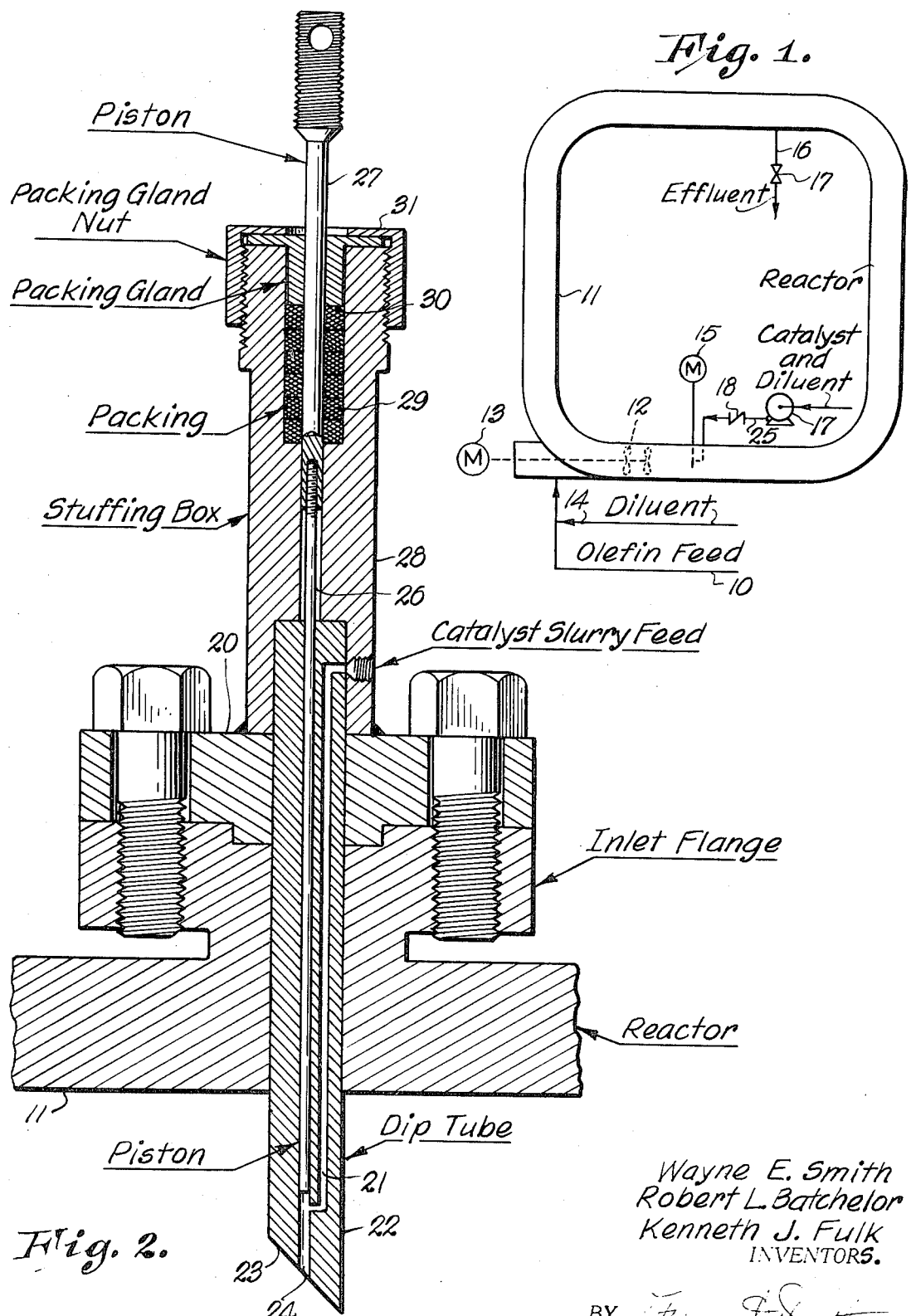

OLEFIN CATALYST SLURRY FEEDING PROCESS AND APPARATUS

BACKGROUND OF INVENTION

It is known that catalysts formed by combining an organometallic compound of a metal of Groups IIA, IIB and IIIA of the Periodic Table with a halide of a metal of Groups IVB, VB or VIB of the Periodic Table are useful for polymerizing mono 1-olefins and diolefins at low pressures and low temperatures to form resinous polyolefins. These catalysts are conventionally produced by reacting the organometallic compound with a metal halide in the presence of a hydrocarbon solvent to form a catalyst slurry.

Polymerization of olefins such as ethylene and propylene is conventionally effected with such catalysts by contacting the olefin with the catalyst slurry in a bulk or mass polymerization zone. It is also conventional to conduct the polymerization reaction in the presence of an inert solvent such as benzene or a saturated hydrocarbon like isooctane, n-hexane, xylene, pentane or cyclohexane. The polymerization reaction is normally effected at a temperature of about 0° to 200° C. and at pressures of about atmospheric or higher.

The introduction of the catalyst slurry to the polymerization reactor is generally complicated by severe fouling at the inlet port. This fouling is attributable to rapid polymerization of the monomer at the catalyst inlet, resulting in plugging of the catalyst inlet port or, in the case of a continuous polymerization loop reactor, plugging of the polymerization reactor.

Accordingly, an object of the invention is to provide an improved method and apparatus for the introduction of catalyst slurries into a polymerization reactor to prevent reactor fouling.

Another object of the invention is to provide an improved process for the polymerization of olefins to produce resinous polyolefins.

Yet another object of the invention is to provide an improved olefin polymerization process employing as an initiator a Ziegler-type catalyst.

Other objects, advantages and features of the invention will be readily apparent to those skilled in the art from the following description, the drawings, and appended claims.

SUMMARY OF INVENTION

By the invention an improved method and apparatus for the introduction of catalyst slurries into mono 1-olefin and diolefin polymerization zones is provided whereby the catalyst slurry is subjected to a substantially constant pressure in passing the catalyst slurry through a first transport zone to a second transport zone, and thereafter the catalyst slurry is swept through the second transport zone by the action of a reciprocating piston member to the polymerization zone.

DESCRIPTION OF DRAWINGS

FIG. 1 is a schematic representation of the invention as applied to an olefin polymerization process utilizing a conventional loop reactor.

FIG. 2 is a detailed cross-sectional, elevated view of the novel catalyst feeding apparatus.

DESCRIPTION OF INVENTION

The invention is applicable to mono 1-olefin and diolefin polymerization processes wherein the olefin polymerization reaction is conducted in a polymerization zone containing less than 50 weight percent of an inert organic solvent. The invention is particularly applicable to bulk or mass polymerization processes wherein the olefin monomer feed to the polymerization reaction zone include mono 1-olefins such as ethylene, propylene, butene-1, pentene-1, hexene-1, 4-methyl-1-pentene, 3-methylbutene-1, and styrene, and/or conjugated dienes of four to eight carbon atoms per molecule such as 1,3-butadiene, isoprene, 2,3-dimethylbutadiene, 2-methoxy-1,3-hexadiene, 1,3-octadiene, and the like.

In the polymerization of olefins such as described above, it is known that catalysts formed by combining an organometallic compound of a metal of Groups IIA, IIB and IIIA of the Periodic Table with a solid halide of a metal of Groups IVB, VB or VIB of the Periodic Table are useful for polymerizing such olefins at low pressures and low temperatures to form resinous polyolefins. In preparing such catalysts, particularly suitable organic metallic compounds are the alkyl, especially the lower alkyl compounds of the metals of Groups IIA, IIB and IIIA, such as aluminum, zinc, cadmium and beryllium. Organometallic compounds in which the metal is attached to cycloalkyl radicals of three to seven carbon atoms or aromatic radical such as phenyl, as well as halogenated compounds such as dialkyl aluminum chlorides, are also suitable.

Some of the solid metal halides useful in preparing the aforementioned catalysts are the halides, particularly the chlorides and bromides, of titanium, zirconium, vanadium, chromium, molybdenum and tungsten, with titanium and vanadium trichlorides and tetrachlorides being preferred, as well as the oxyhalides of such metals including vanadium oxychloride, and complexes such as $AlCl_3 \cdot 2TiCl_3$.

As specific examples of suitable organometallic compounds useful in forming the aforementioned catalysts may be mentioned the dialkyl cadmiums, such as diethylcadmium, dimethylcadmium and diisobutylcadmium, the dialkylzincs, such as diethylzinc and dibutylzinc, the trialkylaluminums and dialkylaluminum hydrides such as diisobutylaluminum hydride, diethylalumium hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having one to four carbon atoms.

These catalysts are conveniently produced by reacting the organometallic compound with the metal halide in the presence of a hydrocarbon solvent such as isooctane, n-heptane, xylene or benzene. The molar ratio between the organometallic compound and the halogenated metal may be varied within wide limits. A ratio of about 0.25 to about 4 mols of halogenated compound, such as a titanium or vanadium trichloride, to 1 mol of the organometallic compound is suitable. A typical catalyst system could comprise a catalyst slurry composed of n-heptane, triisobutylaluminum and solid titanium trichloride with the triisobutylaluminum and titanium trichloride in an equimolar ratio. Such catalyst slurries are applicable in the practice of the invention as hereinafter described.

In addition to the above-described catalyst slurries, the invention is applicable to catalyst slurries comprising an inert organic solvent and the combination of (a) an organometallic compound in which the metal therein is selected from a member of the group consisting of Groups IIA, IIB and IIIA of the Periodic Table, (b) a metal halide in which the metal therein is selected from a member of the group consisting of Groups IVB, VB and VIB of the Periodic Table, and (c) an additive compound selected from the group consisting of those polyamines, polyethers, aminoethers, aminoalcohols and hydroxyethers which normally chelate metals.

The organometallic compounds and the metal halides used in these catalyst compositions are those which are described hereabove and the ratios of these components are the same as employed in the above-described catalysts. For a complete description of additive compounds which may be included in preparation of the catalyst slurries of this invention, reference is made to U.S. Pat. No. 3,219,648.

A suitable method of preparing the catalyst slurries utilizing the additive compound comprises combining at least one of the additive compounds with the organometallic compound and the metal halide component in an inert hydrocarbon solvent, such as isooctane, n-heptane, xylene or benzene. In a second suitable method of preparing the catalyst slurry, the additive compound can be combined with either the organometallic compound or the metal halide before the other is added to the hydrocarbon solvent to form the catalyst slurry, as the order of addition does not critically affect the polymerization process.

Thus, by way of illustration, an aminoalcohol additive compound may be added to titanium or vanadium trichloride prior to the addition of organometallic compound to the solvent, or the additive may be added to the organometallic compound prior to the addition of titanium or vanadium trichloride. Furthermore, two or more additives can be employed in the preparation of catalyst slurries.

In general, up to 0.5 mol of the additive compound per mol of organometallic compound is suitable for producing the catalyst slurries. However, about 0.05 to about 0.5 mol of additive for each mol of organometallic compound is preferably used. Amounts less than 0.05 can be employed but with some sacrifice in polymerization efficiency.

Heating the catalyst composition when combined in an inert solvent at moderately elevated temperature improves the reactivity of the catalyst. By heating is normally meant temperatures of about 60° to 65° C., although with some additive compounds higher temperatures of up to 100° C. or higher can be utilized.

Referring to FIG. 1 and FIG. 2, the invention will hereafter be described as it relates to a propylene polymerization process conducted in a loop reactor. Propylene is continuously introduced at the rate of 9 gallons per hour via conduit means 10 to a conventional 32 gallon reactor 11 comprising a continuous loop. A reaction mixture comprising propylene, polypropylene, catalyst and hydrocarbon diluent is continuously passed in a clockwise direction through loop 11 via a transporting means such as an impeller 12 driven by a motor means 13. A heptane diluent is introduced via conduit means 14 and conduit means 10 to reactor 11 at a rate sufficient to maintain a circulating mixture containing about 10 weight percent polymer solids. The concentration of diluent maintained in the circulating reaction mixture is less than 50 percent by weight of the reaction mixture and in this example will comprise about 10 percent of the reaction or circulating mixture. An effluent mixture comprising polypropylene, heptane and propylene is withdrawn from loop reactor 11 via conduit means 16 and valve means 17.

A reaction temperature in the range of 170°–180° F. is maintained in the circulating mixture. A reaction pressure of about 560 psi is maintained within reactor 11. A catalyst composition comprising 5.9 weight percent tetramethylmethylenediamine, 29.4 weight percent titanium trichloride, and 64.7 weight percent triethylaluminum is combined with a heptane solvent and the resulting catalyst slurry is introduced via the conventional pumping means 19, conduit 25, check valve means 18, transport zone 21 and inlet channel means 24 into reactor 11. The concentration of the catalyst components in the heptane solvent is 0.2 weight percent.

The effluent reaction mixture is withdrawn from reactor 11 via conduit means 16 at a rate equivalent to the feed rate of propylene, heptane and catalyst components to the reaction zone. The rate of production of polypropylene in the polymerization reactor is 5 pounds per hour at a productivity rate of 1,300 pounds of polymer produced per 1 pound of catalyst components introduced into reactor 11.

Although not shown in FIG. 1, temperature control of the circulating reaction mixture can be effected by employing indirect heat exchange zones such as illustrated in U.S. Pat. No. 3,451,785. As described in the said patent, each straight pipe section of the loop can be encased with a jacket containing an inlet and an outlet for the introduction and removal, respectively, of a heat exchange fluid.

The catalyst slurry is introduced into reactor 11 via a dip tube 22 containing a channel or conduit means 21 in normal open communication with a conduit or channel means 24. Conduit 24 is in normal open communication with the interior of reactor 11. Dip tube 22 can be positioned so as to permit introduction of the catalyst slurry into the center of loop reactor 11 or, if desired, adjacent to the interior wall of reactor 11. As illustrated, dip tube 22 has a surface 23 inclined from the normal. It is within the scope of the invention to employ a dip tube 22 having a surface and opening as illustrated in FIG. 2.

A piston 26 is positioned within conduit channel 24. Piston 26 is operated in a reciprocating fashion by a conventional reciprocating motor means 15 and a piston rod 27 in fixed relationship to piston 26 so that in the forward or down position piston 26 extends beyond the point of communication of conduit 24 and reactor 11. In the rear, or up position the forward portion of piston 26 is positioned as illustrated in FIG. 2 to permit communication between conduits 21 and 24.

Dip tube 22 is positioned within reactor 11 by means of a conventional flange 20, bolted to the inlet flange of reactor 11. As further illustrated in FIG. 2, means for guiding the reciprocating action of piston 26 and for effecting a high pressure seal comprises a conventional stuffing box 28. Packing 29 is positioned within stuffing box 28 and adjacent to piston rod 27. A packing gland 30 and a packing gland nut 31 complete the stuffing box assembly.

As described above, the catalyst slurry is pumped via pumping means 19, conduit means 25, check valve means 18, conduit 21 and conduit 24 into reactor 11. Piston 26, operating in a reciprocating manner, moves forward, closing communication between conduits 21 and 24 and sweeping catalyst slurry residue positioned in conduit 24 into reactor 11 and away from the point of communication between conduit 24 and reactor 11, thereby preventing catalyst retention and polymer accumulation at the catalyst inlet.

With piston 26 in the forward position, the pressure within conduit 21 is increased. As piston 26 is moved up or rearward so that the forward extension of piston 26 is above the point of communication between conduits 21 and 24, the sudden pressure drop between conduits 21 and 24 and the opening of conduit 21 being substantially adjacent the point of open communication between conduit 24 and reactor 11, causes the catalyst slurry to be sprayed into reactor 11. Piston 26 and catalyst slurry pumping means 19 are operated simultaneously and substantially continuously responsive to a control signal, not herein illustrated, indicating that additional catalyst slurry is required in the polymerization reaction.

Although the invention has been described with reference to specific materials, embodiments and details, various modifications and changes, within the scope of the invention, will be apparent to those skilled in the art and are contemplated to be embraced in the invention.

What is claimed is:

1. An apparatus comprising a high-pressure vessel, a first conduit in open communication with the interior of said vessel, a piston positioned within said first conduit, a second conduit in normal open communication with said first conduit, means for reciprocally moving the forward portion of said piston beyond the intersection of said first conduit and said second conduit and past the open end of said first conduit positioned within said vessel, and a pump means capable of maintaining a liquid pressure in said second conduit in excess of the reaction pressure within said vessel.

2. The apparatus of claim 1 to include a check valve means positioned in said second conduit.

3. In an olefin polymerization process which comprises polymerizing an olefin selected from the group consisting of mono 1-olefins and diolefins in a polymerization zone in the presence of a catalyst and at a polymerization temperature and pressure; the improvement for introducing said catalyst into said polymerization zone which comprises applying a substantially constant pressure to a catalyst slurry flowing through a first transport zone to a second transport zone, said first transport zone in normal open communication with said second transport zone, and moving a piston member reciprocally through said second transport zone, thereby sweeping said catalyst slurry through said second transport zone to said polymerization zone, said piston member blocking communication between said first and second transport zones and extending past the open end of said second transport zone positioned within said polymerization zone, when in the forward position.

4. The process of claim 3 wherein said catalyst slurry comprises an inert hydrocarbon solvent, and organometallic compound, a metal halide and an additive compound selected from the group consisting of those polyamines, polyethers, aminoethers, amino-alcohols and hydroxyethers which normally chelate metals.

5. The process of claim 3 wherein said olefin is selected from the group consisting of ethylene and propylene.

* * * * *